Nov. 13, 1951  F. P. SOLLINGER ET AL  2,575,237
MULTISTAGE BLADED ROTOR
Filed April 10, 1947  3 Sheets-Sheet 1
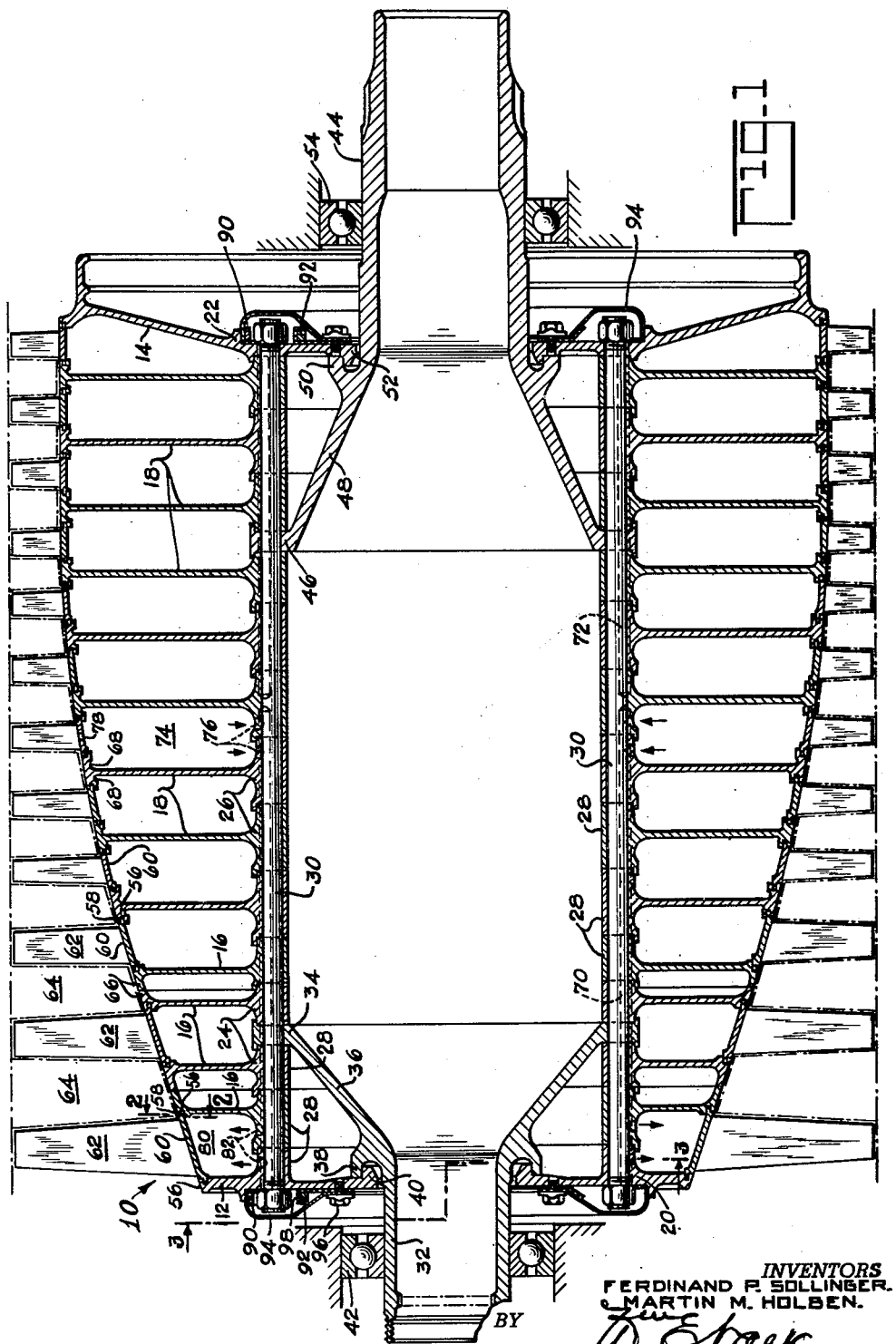
INVENTORS
FERDINAND P. SOLLINGER
MARTIN M. HOLBEN
BY
ATTORNEY

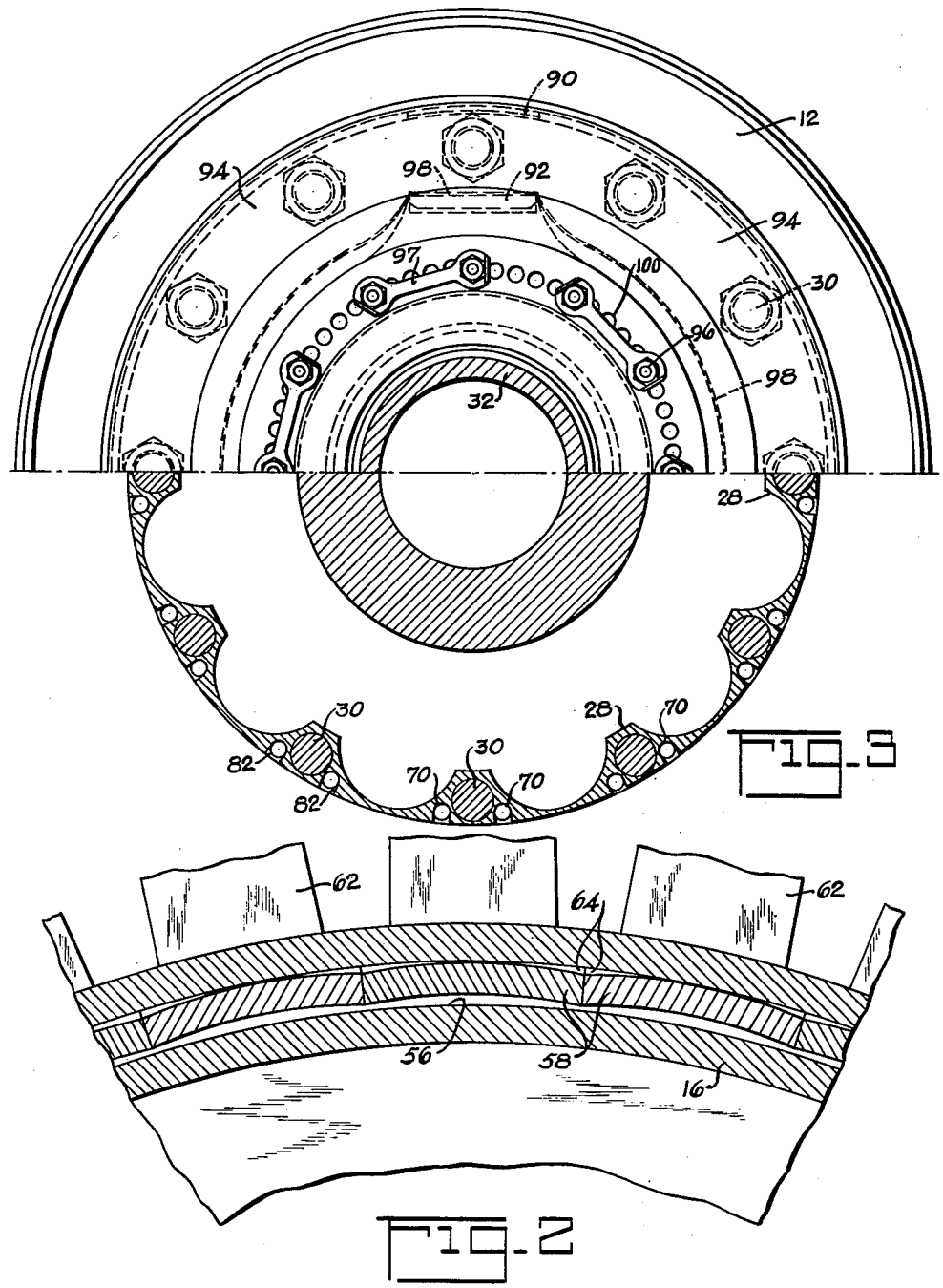

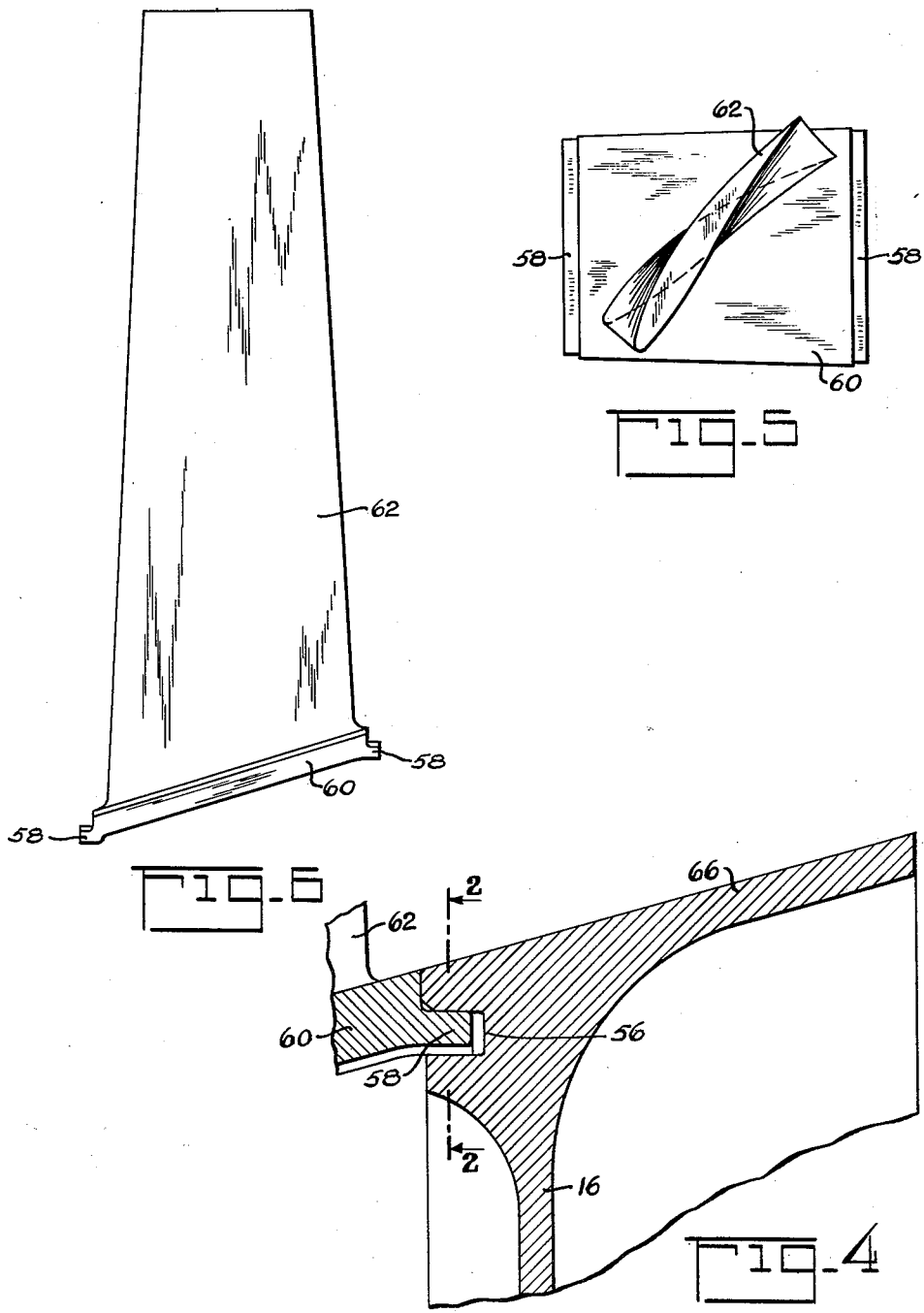

Patented Nov. 13, 1951

2,575,237

UNITED STATES PATENT OFFICE 2,575,237

MULTISTAGE BLADED ROTOR

Ferdinand P. Sollinger, Paterson, and Martin M. Holben, Ridgewood, N. J., assignors to Wright Aeronautical Corporation, a corporation of New York Application April 10, 1947, Serial No. 740,576

15 Claims. (Cl. 230—122)

This invention relates to multi-stage bladed rotors and is particularly directed to a multi-stage compressor and/or turbine rotor having a plurality of axially spaced sets or stages of blades about its periphery.

An object of this invention comprises the provision of a novel and simple multi-stage bladed rotor which is both strong and light in weight, as is quite important in aircraft engines. In multi-stage bladed rotors of the prior art, it has been the general practice to secure each stage of rotor blades to individual discs, the hubs of which are formed integral with or are rigidly secured to a shaft extending through said rotor. This construction like other prior art constructions results in a relatively heavy rotor.

Specifically the multi-stage rotor of the invention comprises a plurality of discs clamped together at their hub portions to form a rigid cylindrical drum which forms part of the rotor shaft. Extension shafts are clamped to said drum adjacent to, but spaced from its ends. Each of said shafts has a diameter substantially less than the internal diameter of said drum and its inner end flares outwardly from an inverted pilot support with the adjacent end of said drum to its point of clamping engagement with said drum. In addition the outer periphery of said rotor discs are formed with facing annular grooves between which the rotor blades are clamped in a manner to reduce blade vibration.

Other objects of the invention will become apparent upon reading the next detailed description in connection with the drawing, in which;

Figure 1 is an axial sectional view through a rotor embodying the invention;

Figure 2 is an enlarged sectional view taken along line 2—2 of Figures 1 and 4;

Figure 3 is a slightly enlarged view taken along line 3—3 of Figure 1;

Figure 4 is an enlarged view of a portion of Figure 1; and

Figures 5 and 6 are top and side views respectively of a typical rotor blade.

The rotor hereinafter described has been designed for use as the rotor of a multi-stage axial compressor for an aircraft gas turbine power plant. However, as will appear, the invention is of general application—for example, the invention is equally applicable to the rotor of a multi-stage axial turbine.

Referring to the drawing, a rotor embodying the invention comprises a cylindrical drum 10 made up of end discs 12 and 14 together with a series of intermediate discs 16 and 18. Each of the discs 12, 14, 16, and 18 are provided with hub portions 20, 22, 24, and 26 respectively. Each of said hub portions are provided with axially extending flanges overlapping the adjacent hub portions whereby each hub portion is piloted or disposed in nested relation with the adjacent hub portion or portions. In addition, the hub portions of each of the discs 12, 14, 16, and 18 are provided with a plurality of circumferentially spaced bosses 28 through which bolts 30 extend for clamping said rotor discs together.

One end of the drum 10 is provided with an extension shaft 32 having an annular radial flange 34 clamped between a pair of disc hub portions 24 adjacent to but spaced from the end disc 12. The inner end of the shaft 32 within the drum 10, comprises an outwardly flaring conical portion 36 interconnecting the shaft flange 34 with the portion of the shaft 32 projecting axially outwardly from said drum. The shaft 32 and end member 12 of the drum 10 are connected together against relative radial movement by means herein termed an "inverted pilot support." This means comprises a co-axial annular flange 38 formed on and about the shaft 32 and having an internal annular surface engaging an external annular surface on a flange 40 formed on a radially inward extension of the end member 12, said flange 40 being disposed about the shaft 32. As herein used, therefore, a connection between a pair of concentric members is termed an "inverted pilot support" if an annular internal surface on the inner of said concentric members engages an annular external surface on the outer of said members. This type of pilot support remains effective even at high rotative speeds because expansion of the drum disc 12 under centrifugal force serves to increase the contact pressure between the flanges 38 and 40. A bearing 42, schematically illustrated in Figure 1 provides a fixed support for the shaft 32 and drum 10 adjacent the end disc 12.

The other end of the drum 10 is provided with an extension shaft 44 similar to the shaft 32. Thus, the shaft 44 is provided with an annular radial flange 46 clamped between the hub portions of a pair of discs 18 adjacent to but spaced from the end disc 14. Also the shaft 44 has a conical portion 48 interconnecting said flange 46 with the portion of said shaft extending out of the adjacent end of the drum 10. Axially extending flanges 50 and 52 on the shaft 44 and end disc 14 respectively, provide an inverted pilot for the shaft 44 and drum 10 similar to the inverted pilot between the shaft 32 and drum 10. In addition a bearing 54, schematically illustrated in Figure 1, supports the shaft 44 and drum 10 adjacent the end disc 14.

As described the flange 34 of the shaft 32 and drum 10 are clamped together at a point spaced from but adjacent to one end of the drum 10 and, at said drum end, relative radial movement between said shaft and drum is prevented by the inverted axial pilot support provided therebetween by the flanges 38, and 40. This two-point connection of the shaft 32 and drum 10 together with the conical shape of the shaft 32 between its said pilot support and its point of clamping engagement with the drum makes the connection between said shaft 32 and drum 10 very rigid against relative bending. Similarly the connection between the shaft 44 and drum 10 is very rigid against relative bending. In this way the drum 10 forms a rigid driving connection between the shafts 32 and 44.

The outer periphery of the drum discs 12, 14, 16, and 18 are provided with facing annular grooves 56 within which are received oppositely extending tongues 58 formed on the root ends 60 of the rotor blades 62. The stator blades 64, disposed between the stages or sets of rotor blades 62, are conventional and therefore have been indicated by dot and dash lines in Figure 1. The intermediate drum discs 16 are disposed adjacent the fluid inlet end of the compressor rotor while the intermediate discs 18 complete the remainder of the drum to the end disc 14.

Each intermediate disc 16 has an annular flange 66 on one side of its periphery extending into abutting engagement with a corresponding flange 66 on the adjacent disc 16 such that each flange 66 bridges approximately ½ the gap between adjacent sets or stages of rotor blades 62. Each intermediate disc 18 is disposed in a plane approximately midway between adjacent sets or stages of rotor blades 62 and oppositely extending annular flanges 68 at the periphery of each disc 18 bridge the space between its associated adjacent sets of rotor blades. The discs 16 and 18 have been formed with this difference in their respective peripherical annular flanges 66 and 68 because of the relatively large width of the stator blades 64 adjacent the inlet of the compressor and because the centrifugal force acting on the rotor blades tends to bend the annular flanges 68 of their associated supporting discs 18. This bending moment is relatively small on the annular flanges 68, adjacent the outlet end of the compressor, because of the relatively small axial length of said flanges at said end, but the magnitude of this bending moment increases toward the compressor inlet because of the increasing length of said flanges. Accordingly adjacent the compressor inlet a modified intermediate disc 16 has been used whereby the centrifugal forces acting on the rotor blades are transmitted to their drum disc web portions through a relatively small moment arm.

The end drum disc 14 acts as a "belleville" washer or spring so that as the bolts 30 are tightened, the stress in the end disc 14 clamps the rotor blades 62 between the outer periphery of the discs 12, 14, 16, and 18, the end disc 12 being relatively rigid. In addition the outer portion of the end disc 14 has a conical shape such that the centrifugal forces on this portion of the disc 14 tend to flatten the disc to increase the clamping pressure of the discs on their blades 62. This action of the centrifugal force on the disc 14 is at least partially balanced, during compressor operation, by the fluid pressure differential across this end disc.

As previously mentioned the root ends 60 of the rotor blades have tongues 58 extending oppositely into adjacent axially-spaced facing annular grooves 56 in the drum discs. In addition the root ends 60 of the rotor blades have a substantially rectangular plate-like shape abutting the root ends of the adjacent blades of the same stage or set. With this construction, the rotor blades 62 of each set are constrained against circumferential movement relative to each other by the abutting engagement of their root ends and said blades are secured against axial and radial movement relative to the rotor by the engagement of their root ends with the peripheries of the discs 12, 14, 16, and 18.

Preferably the radius of curvature of the outer surface of the blade tongues 58 is made slightly smaller than the radius of curvature of the facing surface of their mating annular grooves 56 in order to provide for damping of blade vibration. The magnitude of this difference in curvature is quite small and has been greatly exaggerated in the enlarged view of Figure 2 to permit its illustration. For example, in an actual design calling for 33 blades at the section of Figure 2, the outer radius of the annular groove 56 was 9.163 to 9.164 inches and the groove was .095 to .099 inch wide while the outer radius of each mating blade tongue was 9.103 to 9.163 inches and each tongue 58 was .092 to .094 inch thick. Obviously the invention is not limited to these specific dimensions but they will vary with such factors as, type of material, diameter and speed of rotation of the rotor, as well as the magnitude of the damping desired.

With this blade mounting construction, upon rotation of the rotor each blade 62 is urged radially outwardly against the outer surface of the associated grooves 56 by the centrifugal force acting on each blade. Because the radius of curvature of the outer surface of the tongues 58 is slightly less than the radius of curvature of the engaging surfaces of the associated groove 56, the blades 62 can rock slightly, under load, about the areas of contact of their tongues 58 with the grooves 56 thereby minimizing or damping blade vibration. In addition the centrifugal force acting on each blade tends to flatten their tongues 58 against the outer surface of their associated grooves 56 whereby an increase in the centrifugal force acting on each rotor blade results in a larger area of their tongues 58 being brought into contact with the outer surface of their associated grooves 56. That is, the centrifugal force acting on the blades tends to reduce the clearance indicated at 64 between the ends of the tongues 58 and the outer surface of their associated grooves 56 thereby increasing the contact area of the grooves 56 engaged by the tongues 58 with increase in the centrifugal force acting on the blades. This construction gives the blades 62 a limited radial and rocking freedom which tends to dampen their vibration. In addition the load carrying area on each blade tongue 58 increases with increase in the load as is obviously desirable.

Ducts 70 and 72 are drilled through the bosses 28 on opposite sides of the bolts 30, the ducts 70 being drilled from the left hand of the rotor and the ducts 72 being drilled from the right hand of the rotor, as viewed in Figure 1. The ducts 72 merely serve to lighten the bosses 28 while the ducts 70 have a dual function in that they not only lighten said bosses but also serve to provide the first stage of rotor blades 62 with relatively warm air to prevent the formation of ice thereon. For this purpose each duct 70 communicates with an annular space 74, between a pair of discs 18, through radial passages 76. In addition one or more of the root portions 60 of the rotor blades disposed about the space 74 are provided with bleed holes 78 whereby a small amount of relatively warm compressed air bleeds into the space 74 and thence into one end of the ducts 70. The other end of each duct 70 communicates with an annular space 80 through passages 82 and this space communicates with the interior of the first-stage blades 62 which are made hollow and are provided with bleed holes at their tip portions.

With this arrangement a small percentage of warm compressed air is circulated from an intermediate portion of the compressor back through the hollow first-stage rotor blades, this warm air bleeding from the tip of said first stage blades. In this way the formation of ice on the first-stage blades is prevented. As the air is compressed through successive stages of the rotor, the air heats up so that there may be no danger of the blades icing beyond the first stage. Obviously, however, if desired additional stages of blades may also be provided with warm air from the ducts 70. Only the blades to be provided with warm de-icing air need be hollow, the remainder of the blades may be solid.

Hollow rotor blades are conventional and therefore no attempt has been made to illustrate this structural detail in the drawing.

In order to provide dynamic balance of the rotor, pairs of relatively adjustable weights 90 and 92 are carried on each end of the drum 10. The weights 90 are secured to annular plates 94 which in turn are secured to their respective ends of the drum by machine screws 96. Suitable locking plates 97 are provided to prevent turning of the screws 96. The weights 92 are secured to annular plates 98 which are secured to their respective ends of the drum by the machine screws 96. The annular plates 94 and 98 are both provided with a large number of circumferentially spaced holes 100 for passage of the screws 96 in order to permit each weight 90 and 92 to be disposed in substantially any desired position about the rotor axis.

The magnitude of the individual weights 90 and 92 of each pair is chosen so that each weight by its self produces the same degree of unbalance of the rotor as the other weight of its pair and so that the weights can be rotatively adjusted about the rotor axis relative to each other to balance any unbalance in the rotor which may arise as the result of manufacturing tolerances or to balance any other unbalance of similar magnitude. After assembly of the rotor, any dynamic unbalance may be determined in a suitable balancing machine whereupon the weights 90 and 92 may be rotatively adjusted at both ends of the rotor to place the rotor in balance. This feature is quite important in applicant's composite rotor construction because each time the rotor is disassembled and reassembled, for example in replacing a blade, it is usually necessary to rebalance the rotor. With a pair of relatively adjustable weights 90 and 92 at each end of the rotor it is possible to readily balance the rotor by properly positioning said weights about the rotor axis.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a composite rotor; a plurality of co-axial annular members disposed in side-by-side relation to form a hollow drum; a pair of shaft co-axial with and extending from opposite ends of said drum, each of said shafts having an outwardly flaring frusto-conical portion extending into its associated end of said drum with the inner end of each said frusto-conical portion extending between a pair of said members adjacent to, but spaced from, its respective end of said drum; an annular flange disposed on and about each of said shafts; and a pair of inturned annular flanges on said hollow drum, one at each end of said drum, each of said shaft flanges having an annular internal surface engaging an annular external surface on the drum flange at its respective end of said drum.

2. A rotor comprising a plurality of co-axial annular members secured together in side-by-side relation to form a hollow drum; a shaft co-axial with and extending from one end of said drum, said shaft being secured to said drum at a point adjacent to, but axially spaced from, said drum end; an annular flange disposed on and about said shaft; and an annular inturned flange on said hollow drum at said drum end, said shaft flange having an annular internal surface engaging an annular external surface on said drum flange.

3. A rotor comprising a plurality of co-axial annular members disposed in side-by-side relation to form a hollow drum; a shaft co-axial with and extending from one end of said drum, said shaft having a frusto-conical portion flaring radially outwardly and extending axially part way into said hollow drum, means for securing said annular members together with the inner end of said shaft; an annular flange disposed on and about said shaft; and an annular inturned flange on said hollow drum at said drum end, said shaft flange having an annular internal surface engaging an annular external surface on said drum flange.

4. A rotor comprising a plurality of co-axial annular members secured together in side-by-side relation to form a hollow drum; a shaft co-axial with and extending from one end of said drum, the inner end of said shaft having a portion extending between a pair of said members adjacent to, but spaced from, said drum end for securing said shaft to said drum; an annular flange disposed on and about said shaft; and an annular inturned flange on said hollow drum at said drum end, said shaft flange having an annular internal surface engaging an annular external surface on said drum flange.

5. A rotor comprising a plurality of co-axial annular members disposed in side-by-side relation to form a hollow drum; a shaft co-axial with and extending from one end of said drum, said shaft having a frusto-conical portion flaring radially outwardly and extending axially part way into said drum with the end of said frusto-conical portion having a flange disposed between a pair of said annular members adjacent to, but spaced from, said drum end; means for axially clamping said annular members and shaft together; an annular flange disposed on and about said shaft; a flange on the annular member at said drum end, said shaft flange having an annular internal surface engaging an annular external surface on said annular member flange.

6. A rotor comprising a plurality of co-axial annular members disposed in side-by-side relation to form a hollow drum; a shaft co-axial with and extending from one end of said drum, said shaft having a frusto-conical portion flaring radially outwardly and extending axially part way into said drum with the end of said frusto-conical portion having a flange disposed between a pair of said annular members adjacent to, but spaced from, said drum end; means for axially clamping said annular members and shaft together; a flange disposed on and about said shaft adjacent to the start of said outwardly flaring frusto-conical portion; and an annular inturned flange on said hollow drum at said drum end, said shaft flange having an annular internal surface engaging an annular external surface on said drum flange.

7. A bladed rotor comprising a plurality of co-axial annular members secured together in side-by-side relation to form a hollow drum; said members having annular axially overlapping hub portions disposed in nested relation; a shaft having an outwardly flaring frusto-conical portion extending into one end of said drum with the inner end of said frusto-conical portion having a flange secured between the hub portions of a pair of said annular members disposed adjacent to, but spaced from, said drum end; an annular flange disposed on and about said shaft; an annular inturned flange on said hollow drum at said drum end, said shaft flange having an annular internal surface engaging an annular external surface on said drum flange; and a plurality of sets of blades secured to and projecting radially outwardly from the periphery of said annular members.

8. A bladed rotor comprising a plurality of co-axial annular members disposed in side-by-side relation to form a hollow drum; said members having annular axially overlapping hub portions disposed in nested relation; a shaft having an outwardly flaring frusto-conical portion extending into one end of said drum with the inner end of said frusto-conical portion having a flange secured between the hub portions of a pair of said annular members disposed adjacent to, but spaced from, said drum end; an annular flange disposed on and about said shaft; a flange on the annular member at said drum end, said shaft flange having an annular internal surface engaging an annular external surface on said annular member flange; and a plurality of sets of blades projecting radially outwardly from the periphery of said drum, the root portions of the blades of each set having oppositely extending tongues adapted to be received within facing annular grooves of an adjacent pair of said annular members; and means for axially clamping said annular members together for securing said blades and shaft thereto.

9. A bladed rotor comprising a plurality of co-axial annular members disposed in side-by-side relation; a plurality of sets of blades, the blades of each set being circumferentially spaced and being secured to and extending from the periphery of said annular members; a plurality of bolts circumferentially spaced about the axis of said members for securing said members together to form a hollow rotor; a shaft co-axially extending from one end of said hollow rotor and being secured to said hollow rotor only adjacent to said end, said shaft having a diameter smaller than the internal diameter of the adjacent annular members and having a radially outwardly extending annular portion secured to said hollow rotor, adjacent to said end, by said bolts.

10. A bladed rotor as recited in claim 9 in which the outwardly extending annular portion of said shaft is frusto-conical and is clamped by said bolts between a pair of said annular members adjacent to said one end.

11. A bladed rotor as recited in claim 10 in which the root ends of the blades are clamped between adjacent pairs of said members by said bolts.

12. A bladed rotor comprising a plurality of co-axial annular members disposed in side-by-side relation to form a hollow drum, said annular members having axially extending annular flange portions at their peripheries and having axially extending annular flange portions at their hubs; a plurality of sets of blades, the blades of each set having their root ends disposed between the peripheral flange portions of an adjacent pair of said members; a plurality of bolts circumferentially spaced about the axis of said members and extending through the hub flange portions of said members for clamping said members and blades together to form a hollow rotor; and a shaft co-axially extending from one end of said hollow rotor and being secured to said hollow rotor only adjacent to said one end, said shaft having a diameter smaller than the internal diameter of the adjacent annular members and having a radially outwardly extending annular portion secured to said hollow rotor adjacent to said end.

13. A bladed rotor as recited in claim 12 in which the outer surfaces of the root ends of said blades and the outer surfaces of the peripheral flange portions of said members form a substantially smooth surface from which said blades project.

14. A bladed rotor as recited in claim 12 in which said shaft is secured to said hollow rotor by said bolts.

15. A bladed rotor as recited in claim 14 in which the outwardly extending annular portion of said shaft is frusto-conical, said portion having a flange secured between the hub flange portions of a pair of said annular members disposed adjacent to said drum end.

FERDINAND P. SOLLINGER.
MARTIN M. HOLBEN.

REFERENCES CITED

The following references are of record in the file of this patent:

UNITED STATES PATENTS

| Number | Name | Date |
|---|---|---|
| 1,118,361 | Lasche | Nov. 24, 1914 |
| 1,221,087 | Parsons et al. | Apr. 3, 1917 |
| 1,551,402 | Junggren | Aug. 25, 1925 |
| 2,211,866 | Soderberg | Aug. 20, 1940 |
| 2,308,233 | Schutte | Jan. 12, 1943 |
| 2,334,285 | Philippi | Nov. 16, 1943 |
| 2,427,614 | Meier | Sept. 16, 1947 |

FOREIGN PATENTS

| Number | Country | Date |
|---|---|---|
| 394,001 | Great Britain | June 19, 1933 |

OTHER REFERENCES

Ser. No. 385,333, Schutte (A. P. C.), pub. May 25, 1943.